United States Patent [19]

Ohnuki

[11] Patent Number: 4,515,438
[45] Date of Patent: May 7, 1985

[54] LENS BARREL

[75] Inventor: Mitsuo Ohnuki, Sagamihara, Japan

[73] Assignee: Konishiroku Photo Industry Co., Ltd., Tokyo, Japan

[21] Appl. No.: 363,918

[22] Filed: Mar. 31, 1982

[30] Foreign Application Priority Data

Apr. 1, 1981 [JP] Japan .................................. 56-47250

[51] Int. Cl.³ ............................................... G02B 7/04
[52] U.S. Cl. .................................................. 350/255
[58] Field of Search ........................ 350/255, 563–565, 350/577, 429–430

[56] References Cited

U.S. PATENT DOCUMENTS

| | | | |
|---|---|---|---|
| 2,006,464 | 7/1935 | Laube et al. ........................... | 350/255 |
| 3,249,008 | 5/1966 | Angenieux ............................ | 350/577 |
| 3,472,564 | 10/1969 | Kellner ................................. | 350/255 |
| 3,897,998 | 8/1975 | Someya et al. ....................... | 350/255 |
| 4,172,634 | 10/1979 | Thompson ............................ | 350/255 |
| 4,380,378 | 4/1983 | Tamura ................................. | 350/429 |

Primary Examiner—William H. Punter
Attorney, Agent, or Firm—Jordan B. Bierman

[57] ABSTRACT

A lens barrel having a moving frame moving in a direction of an optical axis of a zoom lens or the like, wherein the outer surface of the moving frame is not slidably moved in contact with the inner surface of the barrel. Instead, multiple guide grooves and an engaging member slidably moved along the guide grooves are provided on the barrel and the moving frame in such a manner that they are not positioned only diametrically on the barrel. Elimination of a rattle or play in the contact between the guide grooves and the engaging member is made easier, and any inner reflection from lubricant on the sliding surface can be avoided.

5 Claims, 16 Drawing Figures

LENS BARREL

BACKGROUND OF THE INVENTION

1. Field of the Invention

The present invention relates to an improvement in a lens barrel, and more specifically, to an improvement in a retaining structure of a moving frame which moves in a direction of an optical axis while being guided by a guide frame.

2. Description of the Prior Art

Most conventional movable lens frames and moving frames such as helicoid rings in lens barrels are designed so that the outer periphery thereof is loosely fitted with the inner surface of a fixed cylinder as a guide frame or a helicoid ring or the like, or threadably engaged with the helicoid ring to retain a position with respect to the optical axis. In such a retaining construction of diametral fitting, the precision of loose fitting or threaded engagement must be increased in order to effect displacement of the moving frame in a direction of an optical axis smoothly without play, and thus such a construction poses disadvantages in that machining costs are expensive. It is also necessary to coat a lubricating agent on the sliding frictional surface because of a large sliding frictional area with the result that the interior of the barrel tends to be contaminated. Further, the sliding frictional surface is exposed alongside the optical axis and as a result, internal reflection tends to occur. In television cameras and cinecameras, it is known that a guide frame and a moving frame engage a rail at an engaging portion in contact therewith to retain a position of the moving frame with respect to the optical axis. Such a retaining construction may obtain the effect in which the sliding frictional area is decreased to reduce a moving resistance of the moving frame but will not overcome a problem in which the sliding frictional surface is exposed even though the area is decreased.

On the other hand, a guide construction of a moving frame is known from Japanese Patent Publication No. 27560/1964 wherein a fixed frame and a moving frame are shaped to have of multiple of guide tongues in the form of a streamer, the guide tongues being engaged with each other so that the moving frame may be guided in a direction of the optical axis. Such streamer-like cantilever guide tongues are likely to produce deformation, posing a problem in practical use. That is, the cantilever guide tongues are relatively stable in a circumferential direction where they engage each other but tend to produce deformation in a radial direction, which is extremely difficult to work out.

SUMMARY OF THE INVENTION

The present invention has been accomplished with the conception that a guide construction is designed to have also a retaining function, to not expose a sliding surface to the side of an optical axis, to decrease a sliding frictional area and to displace a moving frame in a direction of an optical axis smoothly without a play.

According to the present invention, there is provided a lens barrel having a moving frame which displaces in a direction of an optical axis while being guided by a guide frame, characterized in that engaging members provided on the moving frame or guide frame are placed in close engagement with the sides of guide slots extending in a direction of the optical axis, said guide slots being provided at more than two locations spaced at an angle other than 180° on said guide frame or moving frame. The moving frame is retained and guided by the guide frame in a direction of the optical axis without being rattled in a direction at a right angle to the optical axis, and said guide slots or portions with which said engaging members contact are formed of a resin material.

DETAILED DESCRIPTION OF THE PREFERRED EMBODIMENTS

Figure 1:
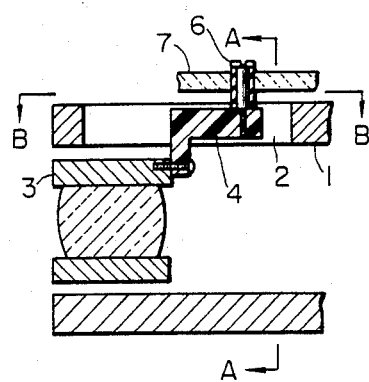
FIGS. 1, 4, 7, 10, 11, 13 and 14 are partial sectional views in which a lens barrel according to the present invention is longitudinally sectioned along a plane including an optical axis.
Figure 2:
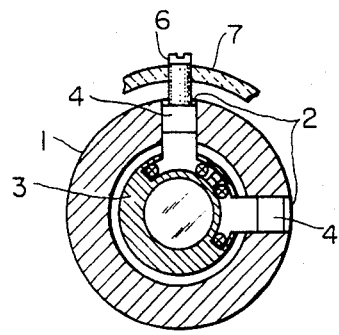
FIGS. 2 and 3 are sectional views taken along line A—A and line B—B, respectively, of FIG. 1.
Figure 3:
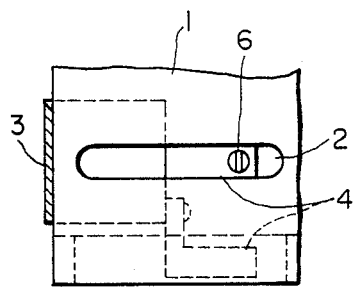

In the embodiments shown in FIGS. 1 to 3, a guide frame 1 corresponding to a fixed cylinder or a helicoid ring is provided with two guide slots 2 extending in a direction of an optical axis spaced apart at an angle of 90°, and a moving frame 3, which is a lens holding frame, has two sliding members 4 formed of a resin material mounted thereon, each of the sliding members having its side of a suitable length in a direction of an optical axis placed in close contact with and engaged with the side of each guide slot 2. Since freedom of motion of the moving frame 3 to the guide frame 1 is limited within a surface parallel to the side of the guide slot 2 by the engagement of the sliding member 4 with one guide slot 2, and since such a freedom of motion is likewise limited within a surface parallel to the side of the guide slot 2 also by engagement of the sliding member 4 with the second guide slot 2, the freedom of motion of the moving frame 3 is obtained only in a direction of a crossed line of the aforementioned surfaces, that is, only in a direction of the optical axis as long as two guide slots 2 are provided spaced apart at an angle other than 180°. Accordingly, even if the guide frame 2 and the moving frame 3 are not fitted so that they are in sliding contact with each other, the moving frame 3 may be held in position with respect to the optical axis and may be displaced in a direction of the optical axis. Reference numeral 7 designates a drive member, which corresponds to a cam cylinder or an operating ring, to displace the thus held moving frame 3 in a direction of the optical axis. A driven pin 6 mounted on the sliding member 4 engages the driving member 7, and as a result, when the driving member 7 is turned about the optical axis, the moving frame 3 is displaced in a direction of the optical axis by said cam or by moving the driving member 7 in a direction of the optical axis. It should be noted that the sliding member 4 is formed of a resin material to provide the close engagement thereof with the guide slot 2 and to minimize a moving resistance. The guide slot 2 can be formed of a resin material or both sliding member and guide slot can also be formed of a resin material, but the abovementioned embodiment will be desirable.

Figure 4:
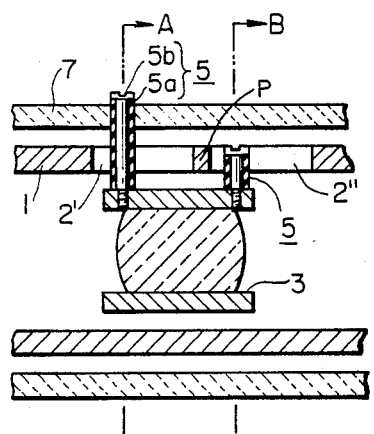
Figure 5:
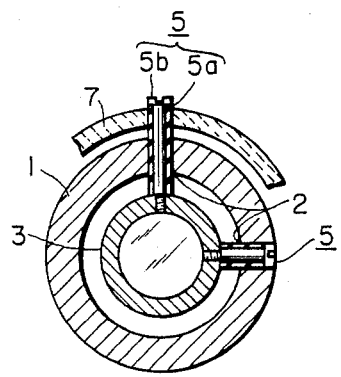
FIGS. 5 and 6 are sectional views taken along line A—A and line B—B, respectively, of FIG. 4.
Figure 6:
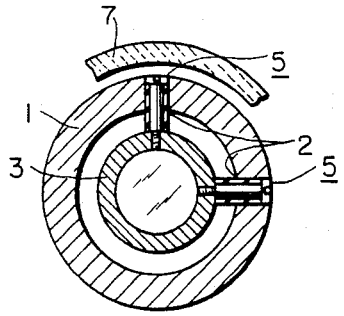

In the embodiments shown in FIGS. 4 to 6, two sliding pins 5 mounted on the moving frame 3 suitably distanced in a direction of an optical axis are used in place of a single sliding member 4 shown in FIGS. 1 to 3. The sliding pin body 5 is designed so that a collar 5a formed of a resin material in close contact with the side of the guide slot 2 is pivotally mounted by an axial pin 5b. Also, the guide slot at one circumferential location is composed of two shorter guide slots 2' and 2" arranged in a direction of the optical axis (two slots are not always necessary to be in one row) in the form of an arrangement wherein a partition P for reinforcement is disposed between the the guide slots 2' and 2", as shown in FIG. 4. The aforementioned two sliding pins 5 are distanced in a direction of the optical axis and are respectively in engagement with the guide slots 2' and 2", one of said sliding pin bodies 5 engaging also with the driving member 7 to serve as the driven pin 6 shown in FIGS. 1 to 3. Also in this embodiment, the operation and effect similar to those in FIGS. 1 to 3 may be obtained. Either or both of the sliding pin body 5 and the guide slot 2 may be formed of a resin material, as in the cases of FIGS. 1 to 3.

Figure 7:
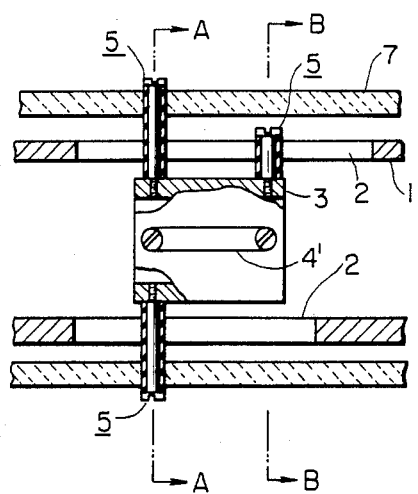
Figure 8:
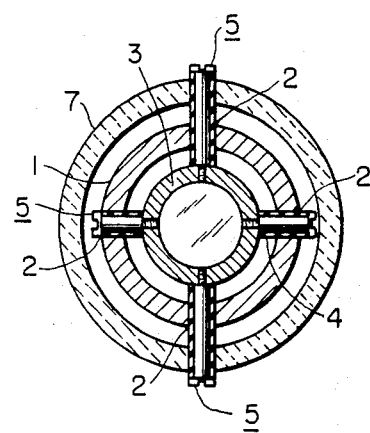
FIGS. 8 and 9 are sectional views taken along line A—A and line B—B of FIG. 7.
Figure 9:
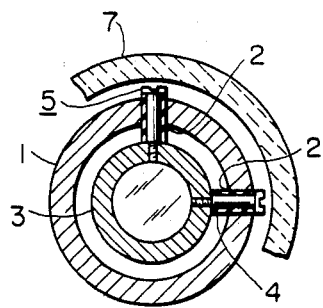

In the embodiments shown in FIGS. 7 to 9, four guide slots 2 spaced apart at an angle of 90° are provided in the guide frame 1. Engaged with one of two guide slots 2 spaced apart at an angle of 180° is a sliding member 4' in the form of a strip or band formed of a resin material mounted on the moving frame 3 by means of two set screws, and engaged with the other is a sliding pin body 5. Engaged with one of another two guide slots 2 spaced apart at an angle of 180° are two sliding pin bodies 5 mounted on the moving frame 3 distanced in a direction of the optical axis. Engaged with the remaining one guide slot 2 is a single sliding pin body 5 mounted on the moving frame 3, one of the sliding pin body 5 and said two sliding pin bodies 5 also engaging the driving member 7. Such embodiments as shown in FIGS. 7 to 9 also have the same operation and effect as those shown in FIGS. 1 to 6. However, the stability and durability for holding the moving frame 3 in the embodiments shown in FIGS. 7 to 9 are better than those shown in FIGS. 1 to 6.

Figure 10:
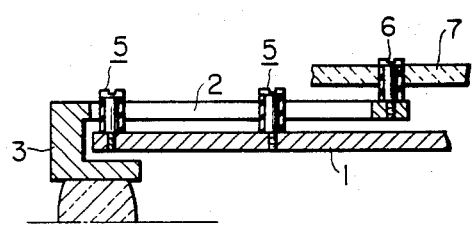

FIG. 10 illustrates an embodiment in which a sliding pin body 5 is provided on a guide frame 1, and a guide slot 2 is provided in a moving frame 3. More than two guide slots 2 are provided spaced apart at an angle other than 180°. The sliding member 4 and two sliding pin bodies 5, distanced in a direction of the optical axis as shown in FIG. 3 or FIGS. 7 to 8 which limit the freedom of motion of the moving frame 3 within a surface parallel to the side of the guide slots 2, are placed in engagement with the respective guide slots 2. The same operation and effect as those of the embodiments shown in FIGS. 1 to 9 may be obtained.

Figure 11:
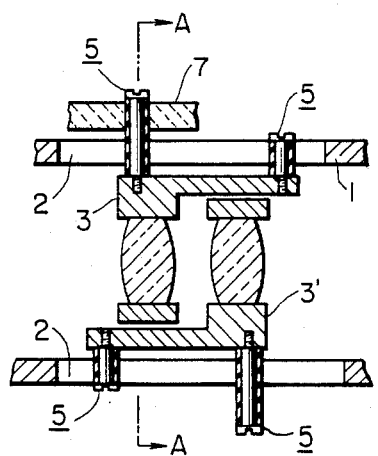
Figure 12:
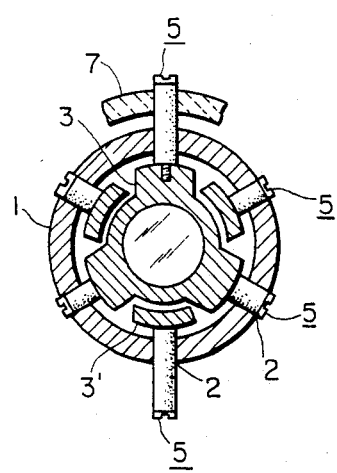
FIG. 12 is a sectional view taken along line A—A of FIG. 11.

FIGS. 11 and 12 illustrate the embodiments wherein six guide slots 2 spaced apart at an angle of 60° are provided on the guide frame 1. Two sliding pin bodies 5 mounted on a single moving frame 3 are engaged spaced in a direction of the optical axis with three guide slots 2 spaced apart 120° among said six guide slots. A sliding pin body 5 mounted on the other moving frame 3' is likewise engaged with other three guide slots 2 spaced apart 120°. One of said sliding pin bodies 5 on the moving frame 3 engages the driving member 7, and one of said sliding pin bodies 5 on the moving frame 3' also engages another driving member (not shown) or the same driving member. In this embodiment, the moving frame 3 as well as 3' are held at their position with respect to the optical axis without being diametrally fitted into the guide frame 1 and are displaced in a direction of the optical axis by the driving member.

Figure 13:
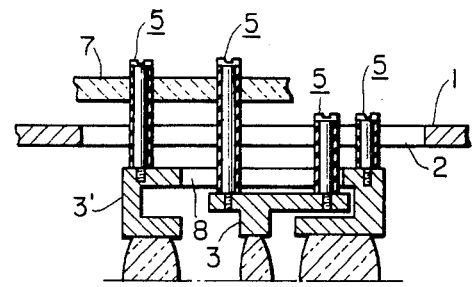

FIG. 13 illustrates an embodiment wherein a moving frame 3 is accommodated internally of a moving frame 3'. Thus sliding pin bodies 5 provided on the moving frame 3 and distanced in a direction of the optical axis engage a guide slot 2 of a guide frame 1 through an escape hole 8 provided in the outer moving frame 3', two sliding pin bodies 5 provided on the outer moving frame 3' and distanced in a direction of the optical axis also engage the same guide slot 2, and one of said sliding pin bodies 5 on the moving frames 3 and 3' also engages the driving member 7. Also in this case, though not shown, since the engagement of said elements with the aforementioned guide slots 2 is effected in connection with more than two guide slots 2 spaced apart at an angle other than 180°, the moving frame 3 is not diametrally fitted into the moving frame 3' and the moving frame 3' is also not diametrally fitted into the guide frame 2. They are held at their position with respect to the respective optical axis and are displaced in a direction of the optical axis by the driving member 7.

Figure 14:
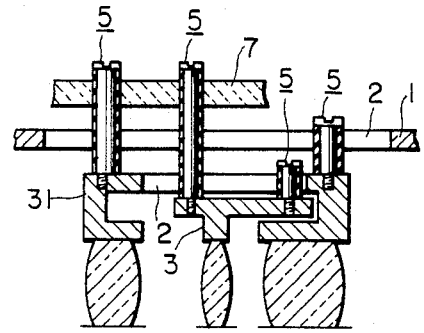

FIG. 14 illustrates an embodiment wherein the moving frame 3 is accommodated internally of the moving frame 31 similar to the case of FIG. 13. In this case, the moving frame 31 serves as a guide frame of the moving frame 3 as well as a moving frame. Two sliding pin bodies 5 provided on the moving frame 3 and distanced in a direction of the optical axis engage a guide slot 2 provided in the moving frame 31. Two sliding pin bodies 5 provided on the moving frame 31 and distanced in a direction of the optical axis engage a guide slot 2 provided in the guide frame 1. One of said sliding pin bodies 5 on the moving frame 3 and one of said sliding pin bodies 5 on the moving frame 31 engage the driving member 7. For this reason, the guide slot 2 of the guide frame 1 serves as an escape hole for the sliding pin body 5 of the moving frame 3 in engagement with the driving member 7. It is also the case here that more than two guide slots 2 spaced at an angle other than 180° are provided in the moving frame 31, more than two guide slots 2 are provided also in the guide frame 1, and the sliding pin bodies 5 engage the respective guide slots 2 as described above. The operation and effect similar to those in the embodiment of FIG. 13 being obtained.

It is noted in the embodiments of FIGS. 13 and 14 that there is an advantage that the strength is excellent since the moving frame hardly impairs its cylindrical configuration, different from those shown in FIGS. 11 and 12.

Figure 15:
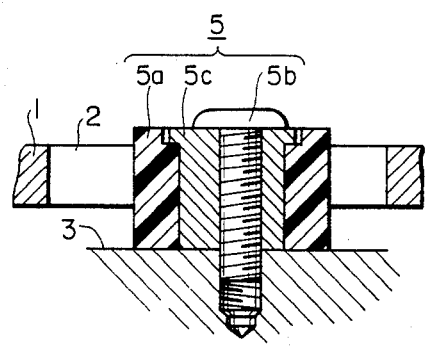
FIGS. 15 and 16 are a sectional view and a plan view, respectively, showing one example of an engaging portion.
Figure 16:
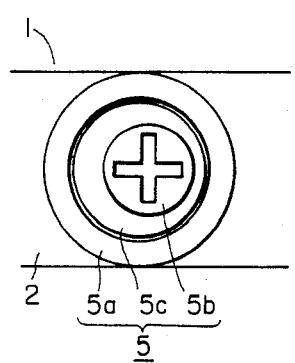

FIGS. 15 and 16 illustrate one embodiment, for the embodiments of FIGS. 4 to 6 or FIG. 10 and thereafter, wherein the sliding pin body 5 is used as an engaging member. The outside diameter of the collar 5a of the sliding pin body 5 is made eccentric with respect to the axial pin 5b, and the direction of said eccentricity is varied to secure it to the axial pin 5b, thus making it possible to make a fine adjustment of the moving frame with respect to the optical axis. In the illustrated embodiments, the collar 5a formed of a resin material is superposed on an eccentric collar 5c and made eccentric with respect thereto. It will be of course understood that the collar 5a and the eccentric collar 5c can be formed integrally. Shifting can be made by varying the eccentric directions of two sliding pin bodies 5 distanced in a direction of the optical axis in the same way, and tilting can be made by varying the eccentric direction of only one sliding pin body 5. It will be also appreciated that the similar effect may be obtained even by an arrangement in which a mounting portion of the engaging member is formed as a separate body which is displaceably secured to one frame, and is not limited to the embodiments illustrated.

According to the present invention as described above, excellent effects are achieved since no diametral fitting between frames as in conventional lens barrels is present. Also, the manufacturing cost of the lens barrels is reduced. Since no sliding frictional surface is presented towards the optical axis, a reflection is prevented on the surface towards the optical axis. Since the sliding frictional portion merely comprises a contact portion between the guide slot and the engaging member, the moving frame is moved smoothly. By the use of a contact of the resin material, the close contact condition can be maintained for a long period of time to avoid use of a lubricating agent. Since the guide frame and the moving frame may have a taper because of absence of the diametral fitting, these elements may be manufactured at less cost by a molding process. Further, when the engaging member is composed of an axial pin and a collar, maintenance and replacement become easy. Moreover, use of an eccentric collar or the like, fine adjustment is rendered possible.

It should be noted that the present invention is not limited to the above-mentioned embodiments. For example, a polygonal configuration may be used, wherein a collar is made eccentric so as to form a quadrangular column formed with an axial bore.

I claim:

1. A lens barrel comprising a movable frame which is displaceable in a direction of an optical axis while being guided by a guide frame, a first set of engaging members, a second set of guide slots each engaged with a corresponding one of said engaging members, wherein one of said sets is provided on the movable frame and the other set is provided on the guide frame, said engaging members and guide slots being provided at more than two locations which are spaced apart circumferentially at an angle other than only 180° and spaced apart in the direction parallel to the optical axis, said guide slots extending in the direction of the optical axis, whereby the movable frame is held and guided relative to the guide frame for movement in the direction of the optical axis, and without play in a direction at a right angle to the optical axis.

2. A lens barrel according to claim 1, wherein said engaging members comprise pin bodies.

3. A lens barrel according to claim 2, wherein said pin bodies each comprise an axial pin and a collar.

4. A lens barrel according to claim 3, wherein said axial pin has an eccentric body.

5. A lens barrel according to claim 1, wherein a contact surface of the guide slots or the engaging members is made of a synthetic resin material.

* * * * *